United States Patent
Stowell et al.

(10) Patent No.: US 11,176,808 B2
(45) Date of Patent: Nov. 16, 2021

(54) INTERFACE ACTUATOR DEVICE AND METHOD OF USE

(71) Applicant: Tyco Fire & Security GmbH, Neuhausen am Rheinfall (CH)

(72) Inventors: John Bradley Stowell, Hollis, NH (US); James T. Roberts, Amherst, NH (US); Joseph Piccolo, III, Fitzwilliam, NH (US); Jean Claude Dore, Longueuil (CA)

(73) Assignee: Johnson Controls Fire Protection LP, Boca Raton, FL (US)

( * ) Notice: Subject to any disclaimer, the term of this patent is extended or adjusted under 35 U.S.C. 154(b) by 1407 days.

(21) Appl. No.: 14/988,949

(22) Filed: Jan. 6, 2016

(65) Prior Publication Data

US 2017/0193811 A1  Jul. 6, 2017

(51) Int. Cl.
| | | |
|---|---|---|
| *G08B 29/14* | (2006.01) | |
| *H04N 7/18* | (2006.01) | |
| *G08C 17/02* | (2006.01) | |
| *G08B 17/06* | (2006.01) | |
| *G08B 29/12* | (2006.01) | |

(52) U.S. Cl.
CPC ........... *G08C 17/02* (2013.01); *G08B 29/145* (2013.01); *H04N 7/183* (2013.01)

(58) Field of Classification Search
CPC ...... G08B 17/06; G08B 29/12; G08B 29/145; G08C 17/02; H04N 7/183
USPC ........................................................ 348/143
See application file for complete search history.

(56) References Cited

U.S. PATENT DOCUMENTS

| | | | |
|---|---|---|---|
| 4,725,818 A | 2/1988 | Motyka et al. | |
| 4,796,025 A | 1/1989 | Farley et al. | |
| 4,908,602 A * | 3/1990 | Reich ..................... | G08B 29/12 340/506 |
| 5,155,468 A | 10/1992 | Stanley et al. | |
| 5,173,683 A | 12/1992 | Brighenti et al. | |
| 6,326,898 B1 * | 12/2001 | O'Leyar ............... | H01F 7/1844 340/635 |

(Continued)

FOREIGN PATENT DOCUMENTS

| | | | | |
|---|---|---|---|---|
| DE | 102014117117 B3 * | 11/2015 | ............. | G05G 11/00 |
| JP | 2010124329 A * | 6/2010 | | |
| JP | 2010124329 A * | 6/2010 | | |

OTHER PUBLICATIONS

"4010 Fire Alarm: Front Panel Installing, Operating and Programming Instructions," Simplex Time Recorder Co., Copyright 2000. 198 pages.

(Continued)

*Primary Examiner* — Christopher S Kelley
*Assistant Examiner* — Kathleen M Walsh
(74) *Attorney, Agent, or Firm* — HoustonHogle LLP

(57) ABSTRACT

An interface actuator device, an interface actuator system, and a system and method for remotely controlling an interface of a control panel are disclosed. The interface actuator device includes an actuator for controlling the interface of the control panel and an attachment mechanism for mounting the interface actuator device to the control panel. The system can further include a camera for capturing images of the interface and a mobile device for controlling the actuator and viewing the images from the camera.

8 Claims, 8 Drawing Sheets

(56) References Cited

U.S. PATENT DOCUMENTS

| | | | | |
|---|---|---|---|---|
| 2006/0119704 A1* | 6/2006 | Buchheit | G05B 23/0229 | |
| | | | 348/143 | |
| 2006/0253598 A1* | 11/2006 | Nakamura | H04L 12/2803 | |
| | | | 709/230 | |
| 2007/0241878 A1* | 10/2007 | Jobe | G08B 25/14 | |
| | | | 340/506 | |
| 2007/0262847 A1* | 11/2007 | Grabinger | G08C 17/02 | |
| | | | 340/3.1 | |
| 2008/0084291 A1* | 4/2008 | Campion | G08B 29/123 | |
| | | | 340/514 | |
| 2014/0022385 A1* | 1/2014 | Fischer | H04M 1/72538 | |
| | | | 348/143 | |
| 2014/0267112 A1* | 9/2014 | Dunn | G06F 3/016 | |
| | | | 345/173 | |
| 2014/0340215 A1* | 11/2014 | Piccolo, III | G08B 29/12 | |
| | | | 340/514 | |
| 2015/0124087 A1* | 5/2015 | Jones, Jr. | G08B 13/19695 | |
| | | | 348/143 | |
| 2015/0206421 A1 | 7/2015 | Moffa | | |
| 2016/0112211 A1* | 4/2016 | Sohnis | G08B 25/04 | |
| | | | 340/538.15 | |

OTHER PUBLICATIONS

"Linear Solenoid Actuator Theory and Tutorial.pdf," http://www.electronics-tutorials.ws/io/io_6.html, Nov. 20, 2015. Six pages.

* cited by examiner

INTERFACE ACTUATOR DEVICE AND METHOD OF USE

BACKGROUND OF THE INVENTION

Fire alarm systems are often installed within commercial, residential, or governmental buildings. Examples of these buildings include hospitals, warehouses, schools, hotels, shopping malls, government buildings, and casinos. The fire alarm systems monitor fire conditions, such as smoke or heat, and alert occupants when the detected fire conditions are potentially indicative of fire.

The fire alarm systems typically include a control panel, fire detectors, and notification devices connected to one another via an emergency network. The fire detectors (e.g., smoke detectors, carbon monoxide detectors, and temperature sensors) detect the fire conditions and then send alarm signals to the control panel via the emergency network when the detected smoke, carbon monoxide, or temperature exceeds a threshold, for example. The control panel responds to the alarm signals by activating notification devices (e.g., speakers, strobes, and/or strobe/speaker combo devices) that alert occupants of the potential fire.

Typically, fire detectors are periodically tested (e.g., monthly, quarterly, or annually depending on fire or building codes) to verify that the fire detectors are physically sound, unaltered, working properly, not obstructed, properly labeled, and located in their assigned locations. Testing of the fire detectors is often accomplished by technician(s) performing walkthrough tests.

During the walkthrough tests, one technician will often move through the building to activate fire detectors while the control panel is in a test mode. The technician can activate fire detectors by, for example, applying real or artificial smoke to the fire detectors. Upon activation, the fire detectors send the alarm signals to the control panel.

The walkthrough test typically requires a second technician to monitor and control an interface of the control panel. While the first technician walks through the building and activates fire detectors, the second technician remains at the control panel controlling and monitoring the interface. The technicians communicate with each other via mobile devices (e.g., radios or mobile phones) to coordinate testing of each fire detector during the walkthrough test.

In one example walkthrough test, the first technician and the second technician collaborate in testing fire detectors while recording results as handwritten notes. After receiving communication from the first technician that a fire detector was activated, the second technician monitors the interface for a notification (e.g., flashing LED) confirming that the control panel received alarm signals from the activated fire detector. Then, the second technician performs a control panel acknowledgement by depressing an alarm acknowledge key on the interface. This acknowledgement is repeated for each successful test of the fire detectors. After the group of fire detectors is tested, the second technician resets the control panel by manually depressing a system reset key on the interface. The first technician then moves to the next testing location for testing of another group of fire detectors. In this example, technicians might record results (e.g., whether the control panel received alarm signals) for the fire detectors as handwritten notes.

In another walkthrough test example, a service box is connected to the control panel for automatically recording results. The service box records information received during testing of the fire detectors. Nevertheless, the second technician might still be needed for monitoring and controlling the interface during the walkthrough test.

There are other instances during installation, maintenance and repair when actions are required at both the control panel and at places remote from the panel. For example, if a wire fault exists, a technician will often have to find the location of the fault, fix the fault, and then return to the panel to confirm whether the fix has corrected the fault condition from the perspective of the control panel. In another example, in the case of duplicate device addresses, the technician might have to replace or reconfigure a smoke detector, return to reset the panel, and then determine whether the panel is still registering duplicate addresses. In each of these instances, multiple technicians are required or a single technician must travel back and forth between the panel and the remote devices.

SUMMARY OF THE INVENTION

Embodiments of the present invention feature an interface actuator device. The interface actuator device can be remotely directed to control the interface of the control panel. For example, a technician can use a mobile device to wirelessly direct the interface actuator device to control the interface, e.g., depress a button of the interface, while the technician is activating or fixing a remote device, such as a smoke detector.

The interface actuator device can be used with different types of control panel interfaces. The interface actuator device preferably includes features for adjusting a position (lateral position and/or height position) of its actuator relative to the interface of the control panel. This allows for the interface actuator device to be adjusted for use with various interfaces.

Embodiments of the present invention further provide a capability of remotely monitoring the interface while remotely controlling the interface. In these embodiments, a camera is provided for capturing images of the interface. The technician can use the mobile device to view the images from the camera while controlling the interface actuator device. This allows the technician to remotely monitor a status of the interface while remotely controlling the interface.

In general, according to one aspect, the invention features an interface actuator device for a control panel of a fire alarm system. The interface actuator device includes an actuator for controlling an interface of the control panel and an attachment mechanism for mounting the interface actuator device to the control panel.

In one example, the actuator includes an actuator plunger and a solenoid for driving the actuator plunger to control the interface of the control panel. Also, the attachment mechanism can be a magnet, an adhesive pad, or a suction device, for example.

The interface actuator device can include an actuator communication port for receiving an activation command from a service box causing the actuator to control the interface of the control panel. The interface actuator device can additionally or alternatively include an actuator wireless interface for receiving an activation command from a service box or a mobile device causing the actuator to control the interface of the control panel.

The interface actuator device preferably includes an electronics module having a battery for powering the actuator and a charger port for receiving power for recharging the battery.

The interface actuator device includes a frame for supporting the actuator on the attachment mechanism. The frame preferably includes an extension arm that telescopes to enable positioning of the actuator relative to the attachment mechanism. The frame preferably provides for height adjustment of the actuator relative to a surface of the control panel.

In general, according to another aspect, the invention features an interface actuator system for a control panel of a fire alarm system. The interface actuator system includes an actuator for controlling an interface of the control panel, a camera for capturing images of the interface, and a mobile device for controlling the actuator and viewing the images from the camera. The interface actuator system can further include a service box for receiving wireless communication from the mobile device and for controlling the actuator based on the received wireless communication. The service box can power the actuator.

In general, according to another aspect, the invention features a system for remotely controlling an interface of a control panel of a fire alarm system. The system has an interface actuator device including an actuator for controlling the interface of the control panel and an attachment mechanism for mounting the interface actuator device to the control panel. The system also includes a mobile device for communicating an activation command to the interface actuator device causing the actuator to control the interface. The system can further include a service box for wirelessly receiving the activation command. The service box directs the interface actuator device to control the interface based on receipt of the activation command.

The interface might include a rubber switch, a membrane switch, or a touch-screen interface switch.

In general, according to another aspect, the invention features a method for remotely controlling an interface of a control panel of a fire alarm system. The method comprises mounting an interface actuator device to the control panel. A mobile device is used to communicate an activation command to the interface actuator device. The interface actuator device controls the interface of the control panel.

The method can further include steps of using a camera to capture images of the interface and using the mobile device to view the images from the camera. The method can further include a step of using the mobile device to confirm that the interface actuator device controlled the interface based on the images from the camera.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
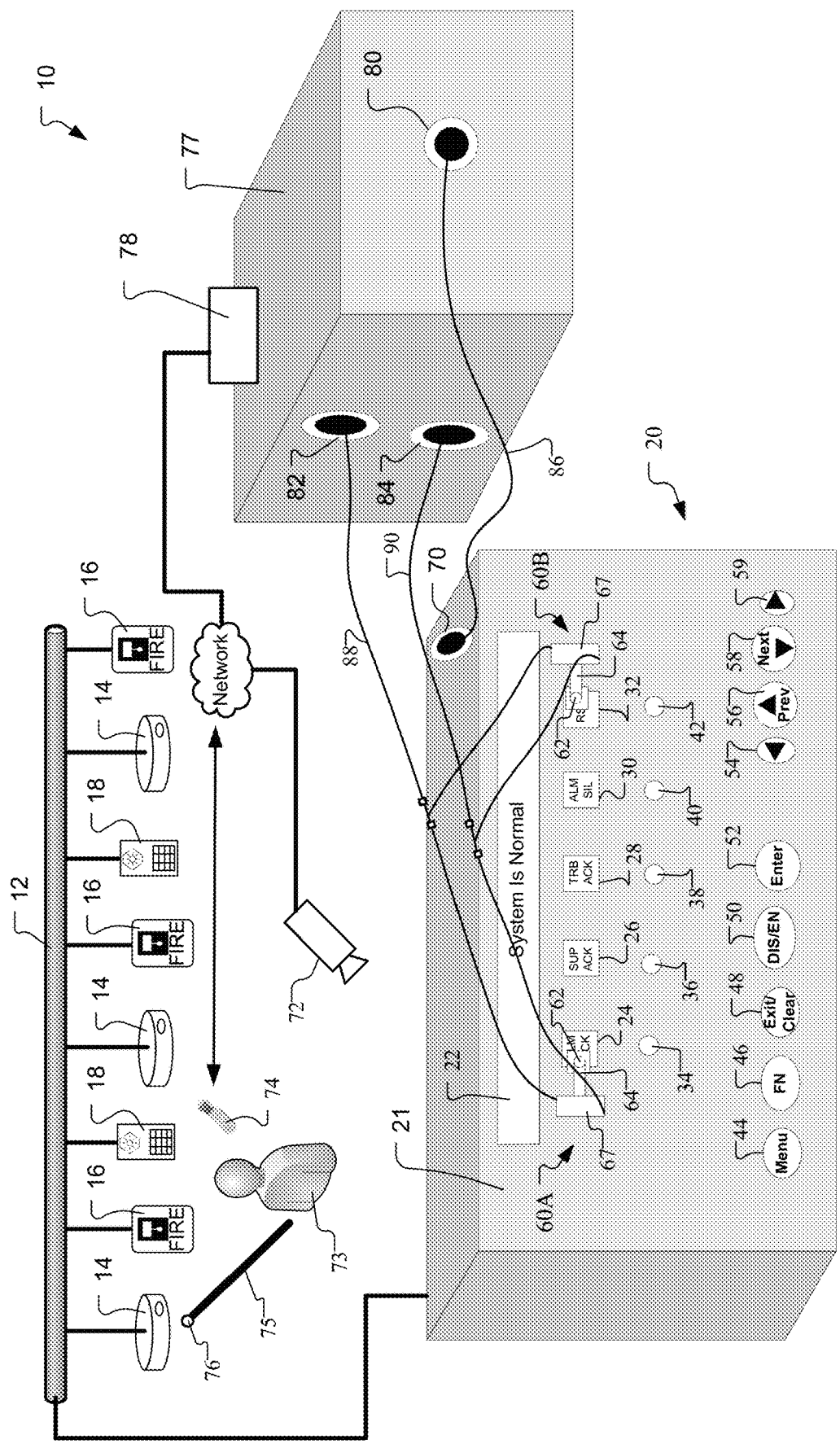
FIG. 1A is a schematic diagram of a fire alarm system including two interface actuator devices wired to a service box during a walkthrough test or other system service event.

FIG. 1A depicts a fire alarm system 10 that utilizes at least one interface actuator device 60 (first 60A, second 60B), according to principles of the present invention.

Each interface actuator device 60A, 60B provides a capability of remotely controlling a different button or part of an interface 21 of a control panel 20. Each interface actuator device 60A, 60B is mounted to the control panel 20 such that it can provide separate control the interface 21 of the control panel 20. In the illustrated example, a technician 73 is able to remotely control each interface actuator device 60A, 60B while testing the fire alarm system 10 away from the control panel 20.

As is common, the fire alarm system 10 includes the control panel 20, fire detectors 14, pull stations 16, and notification devices 18 connected to one another via an emergency network 12. The control panel 20 uses the emergency network 12 to communicate with the fire detectors 14, pull stations 16, and notification devices 18. The fire detectors 14 (e.g., smoke detectors, carbon monoxide detectors, and temperature sensors) detect fire conditions (e.g., smoke, heat, or carbon monoxide) and then send alarm signals to the control panel 20 when the detected smoke, carbon monoxide, or temperature exceeds a threshold, for example. In response, the control panel 20 activates notification devices 18 (e.g., speakers, strobes, and/or strobe/speaker combo devices) that alert occupants of the potential fire.

The interface actuator devices 60A, 60B are typically capable of controlling different types of control panels 20 interfaces such as rubber keypad interfaces, membrane user interfaces, and touch screen interfaces.

In FIG. 1A, the interface 21 includes keys 24-32, 44-59 that can be depressed to initiate various types of control. Specifically, the interface 21 includes the following operator keys 24-32: alarm acknowledge key 24, supervisory acknowledge key 26, trouble acknowledge key 28, alarm silence key 30, and system reset key 32. The alarm acknowledge key 24, supervisory acknowledge key 26, and trouble acknowledge key 28 are respectively used to acknowledge any unacknowledged fire alarms, any unacknowledged supervisories, and any unacknowledged troubles in the system 10. The alarm silence key 30 is used to silence any silenceable output types. The system reset key 32 is used to reset all devices and reset the control panel 20. The interface 21 also includes the following menu navigation keys 44-59: menu key 44, function key 46, disable/enable key 48, exit/clear key 50, enter key 52, left arrow key 54, previous key 56, next key 58, and right arrow key 59 for initiating menu control. The menu key 44 and function key 46 respectively enable presentation of a main menu structure and presentation of a function menu. The disable/enable key 48 is used to disable or enable menu functions. The exit/clear key 50 is used to back out of menus to get to the main menu structure. The enter key 52 is used to confirm selections. The right arrow key 59 and left arrow key 54 are used to advance through multiple choices in menus. The previous key 56 and the next key 58 are used to navigate from screen-to-screen within menus. In general, depressing the keys 24-32, 44-59 initiates the interface control. These keys 24-32, 44-59 can be rubber switches, membrane switches, or touch-screen interface switches for initiating control of the interface 21. In other examples, the keys 24-32, 44-59 might be other types of switches as appreciated by one of skill in the art for enabling user control input at the interface 21.

The interface 21 includes a display 22 and operator LEDs 34-42 for providing notice that one or more keys 24-32, 44-59 were depressed. For example, in response to depressing the system reset key 32, the display 22 indicates that a reset is in progress. In response to depressing the disable/enable key 48, the display 22 presents a confirmation screen that an action was disabled or enabled. The display can present the function menu when the function key 46 is depressed. The operator LEDs 34-42 (alarm acknowledge LED 34, supervisory acknowledge LED 36, trouble acknowledge LED 38, alarm silence LED 40, and system reset LED 42) can also provide notice regarding the status of each operator function for respective operator keys 24-32. For example, the alarm acknowledge LED 34 typically flashes when there is an alarm condition. When the alarm acknowledge key 24 is depressed, the alarm acknowledge LED 34 stops flashing indicating that the alarm has been acknowledged.

FIG. 1A depicts the fire alarm system 10 during a walkthrough test. As described above, the walkthrough test is intended to verify that fire detectors 14 are physically sound, unaltered, working properly, not obstructed, properly labeled, and located in their assigned locations.

Two interface actuator devices 60A, 60B are installed over keys 24, 32 for performing a control panel acknowledgement and a control panel reset during the walkthrough test. The first interface actuator device 60A is installed such that its actuator 62 is positioned to depress the alarm acknowledge key 24 (control panel acknowledgement). The second interface actuator device 60B is installed such that its actuator 62 is positioned to depress the system reset key 32 (control panel reset).

The control panel 20 is connected to a service box 77 using a panel-service cable harness 86. One end of the panel-service cable harness 86 is plugged into a control panel connector 70 of the control panel 20. The other end of the panel-service cable harness 86 is plugged into a service box connector 80 of the service box 77. The panel-service cable harness 86 can be a 10 pin to 10 pin cable harness.

While connected, the service box 77 monitors the control panel 20 during the walkthrough test. For example, the service box 77 records results of the walkthrough test from the control panel 20. The service box 77 is configured to specifically record whether alarm signals were received by the control panel 20 from the activated fire detectors 14 during the walkthrough test. The alarm signals can include location and/or address information of the activated fire detectors 14. Thus, the technician 73 can use the service box 34 to verify if a particular fire detector 14 is working properly based on the location and/or address information received in the alarm signals. In one example, the service box 77 is an ExacTech ST1 box.

The technician 73 uses a mobile device 74 to remotely direct the interface actuator devices 60A, 60B. The mobile device 74 can be used to remotely communicate an activation command to the interface actuator devices 60A, 60B causing control of the interface 21. The mobile device 74 can be a laptop computer, a smart phone, a tablet computer, or a phablet computer (i.e., a mobile device that is typically larger than a smart phone, but smaller than a tablet), to list a few examples. In one example, the user interface displayed on the mobile device includes active areas on its touchscreen display, which when selected result in the operation of the corresponding one of the actuator devices 60A, 60B.

The service box 77 receives wireless communication from the mobile device 74 for controlling the interface actuator devices 60A, 60B. The service box 77 connects with the mobile device 74 via a communication network. In the FIG. 1A example, the service box 77 specifically includes a network interface 78 that receives a cable for accessing the communication network. The service box 77 has a service communication port 82 (e.g., RS232 port) that receives a communication cable harness 88 which is also plugged into the interface actuator devices 60A, 60B. Thus, the mobile device 74 can wirelessly send the activation command to the service box 77 via the communication network. Then, the service box 77 can direct the interface actuator devices 60A, 60B via the communication cable harness 88 to control the interface 21 such as depress a button on the interface.

The service box 77 further provides power to the interface actuator devices 60A, 60B in the illustrated example. The service box 77 specifically includes a service charger port 84 that receives one end of a charger cable harness 90. The other end of the charger cable harness 90 is plugged into the interface actuator devices 60A, 60B. Thus, the service box 77 can supply power to the interface actuator devices 60A, 60B (i.e., powering the actuator 62) via the service charger harness 90.

In one example, a camera 72 is further included for monitoring the interface 21 during the walkthrough test. The camera 72 is installed for capturing images of the interface 21 (e.g., display 22 and/or operator LEDs 34-42). The camera 72 is connected to the communication network allowing the mobile device 74 to access the images of the camera 72. The mobile device 74 can wirelessly receive and display the images from the camera 72. Thus, for example, the technician 73 can confirm whether the control panel 20 responded to keys 24, 32 being depressed by interface actuator devices 60A, 60B based on information presented on the display 22 or statuses of LEDs 34, 42 (e.g., flashing or not flashing).

There are other instances during installation, maintenance and repair where the technician 72 uses the camera 72 with the interface actuator devices 60A, 60B to monitor and control the interface 21. For example, if a wire fault exists, the technician 72 can remotely fix the fault while using the mobile device 74 to monitor and control the interface 21. The technician 72 can determine whether the fault has been cleared on the interface 21 by viewing the images from the camera 72 on the mobile device 74. In one example, the user interface displayed on the mobile device 74 includes both active areas on its touch-screen display that are used to activating of the actuator devices 60A, 60B and a video window in which video images from the camera are displayed adjacent to the active areas.

Figure 1B:
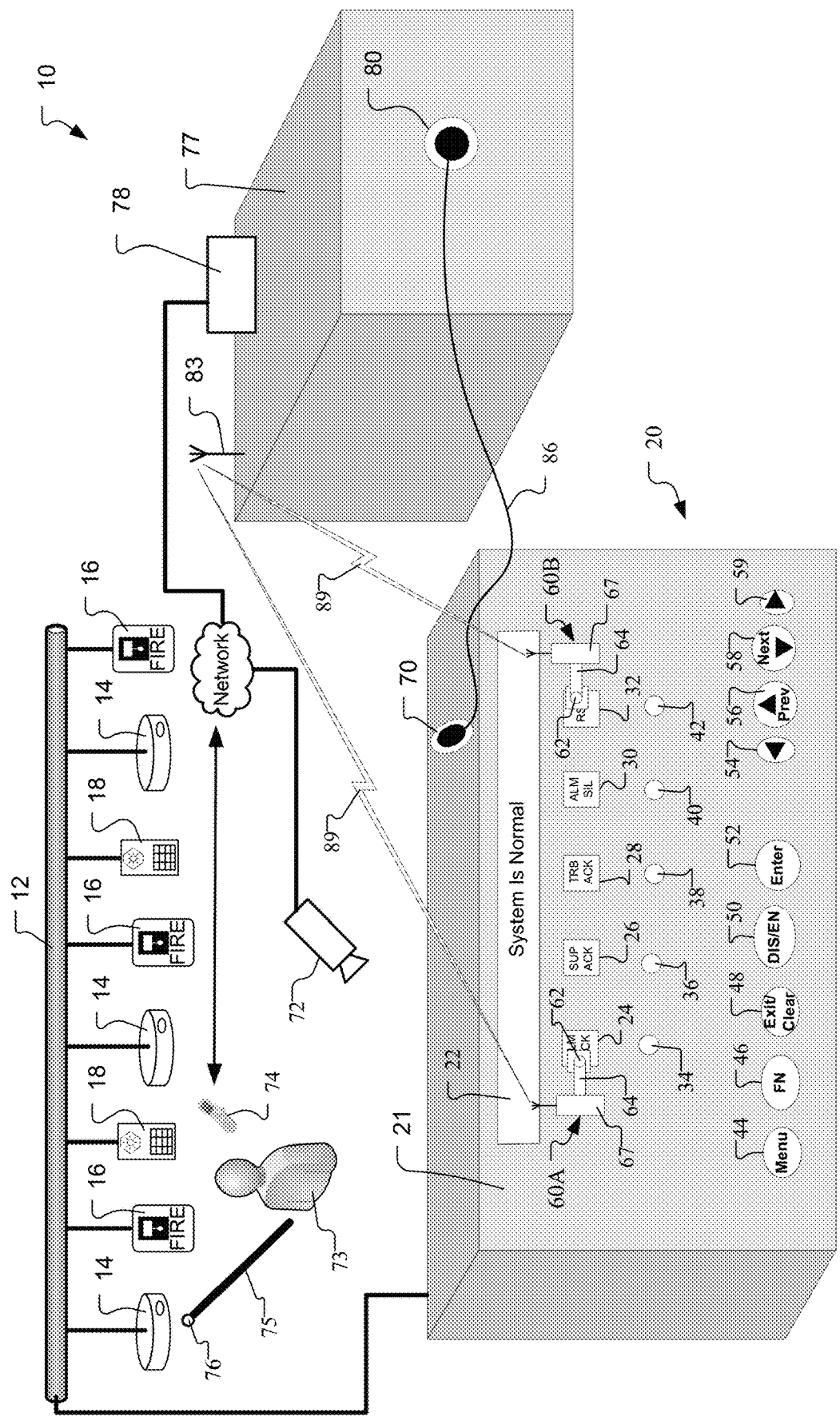
FIG. 1B is a schematic diagram of another fire alarm system including two interface actuator devices wirelessly connected to the service box during the walkthrough test or other system service event.

FIG. 1B is nearly identical to FIG. 1A except the service box 77 communicates wirelessly with the interface actuator devices 60A, 60B. In this example embodiment, the service box 77 has a service communication transceiver 83 that wirelessly connects to transceivers of the interface actuator devices 60A, 60B. The service box 77 wirelessly connects with the interface actuator devices 60A, 60B via communication links 89. In embodiments, these links 89 can be based on the Bluetooth or WiFi communications protocols. Thus, the mobile device 74 can wirelessly send the activation command to the service box 77 via the communication network. Then, the service box 77 can wirelessly direct the interface actuator devices 60A, 60B via the communication links 89 to control the interface 21.

Figure 1C:
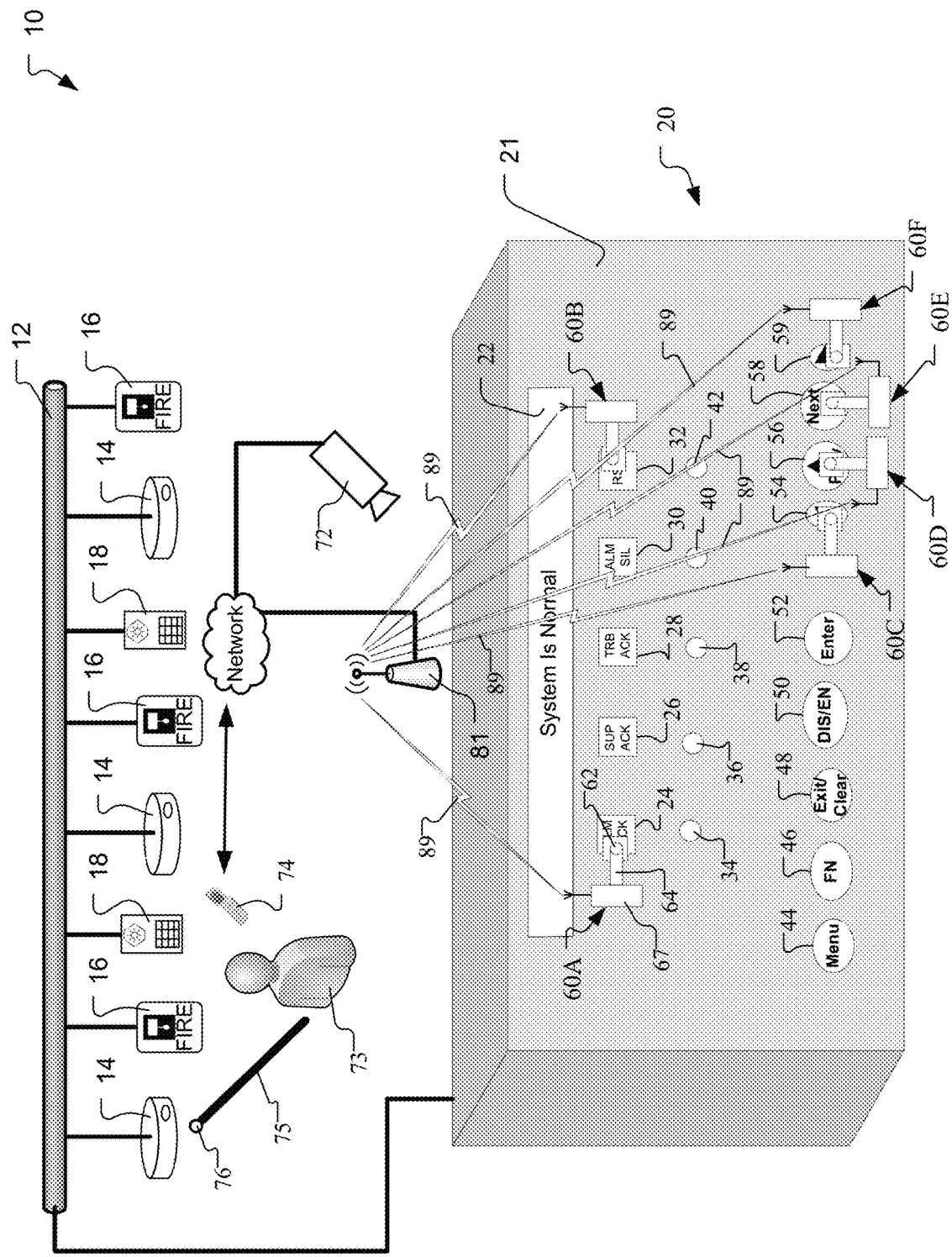
FIG. 1C is a schematic diagram of another fire alarm system including six interface actuator devices wirelessly connected to a mobile device during the walkthrough test or other system service event.

In the FIG. 1C embodiment, the mobile device 74 wirelessly communicates with the interface actuator devices 60A, 60B without the service box 77. The interface actuator devices 60A, 60B wirelessly access the communication network via a wireless access point 81. The mobile device 74 wirelessly directs the interface actuator devices 60A, 60B via the communication network without requiring the service box 77. Thus, the mobile device 74 can wirelessly send the activation command directly to the interface actuator devices 60A, 60B causing their respective actuators 62 to control the interface 21.

FIG. 1C further illustrates the system 10 incorporating more than two interface actuator devices 60A, 60B. In this example, the mobile device 74 directs four additional interface actuator devices 60C-60F—totaling six interface actuator devices 60A-60F. The four additional interface actuator devices 60C-60F are installed to control the left arrow key 54, the previous arrow key 56, the next arrow key 58, and the right arrow key 59. In this example, one or more of the interface actuator devices 60A-60F can be activated at a given time. Preferably, the user interface displayed on the mobile device includes six active areas on its touch-screen display, which when selected result in the operation of the corresponding one of the six actuator devices 60A, 60B, 60C, 60D, 60E, 60F.

Also, communication to each actuator 60A, 60B, 60C, 60D, 60E, 60F can be linked or separated. As appreciated by one of skill in the art, the number of interface actuator devices 60 can be varied as desired by the technician 73. As appreciated by one of skill in the art, the interface actuator devices 60A-60F may be installed or positioned over other operator keys such as the system supervisory acknowledgment key 26, the system trouble acknowledgement key 28, or the alarm silenced key 30. As appreciated by one of skill in the art, the interface actuator devices 60A-60F can be installed over other menu navigation keys such as the menu key 44, the function key 46, the disable/enable key 48, the exit/clear key 50, or the enter key 52.

As shown in FIGS. 1A-1C, each interface actuator device 60 includes the following main components: the actuator 62, a frame 64, and a body 67. The frame 64 is attached to the body 67 and the actuator 62 extends from the frame 64. The body 67 of the interface actuator device 60 is mounted to the control panel 20 such that the actuator 62 is positioned to control the interface 21.

Figure 2:
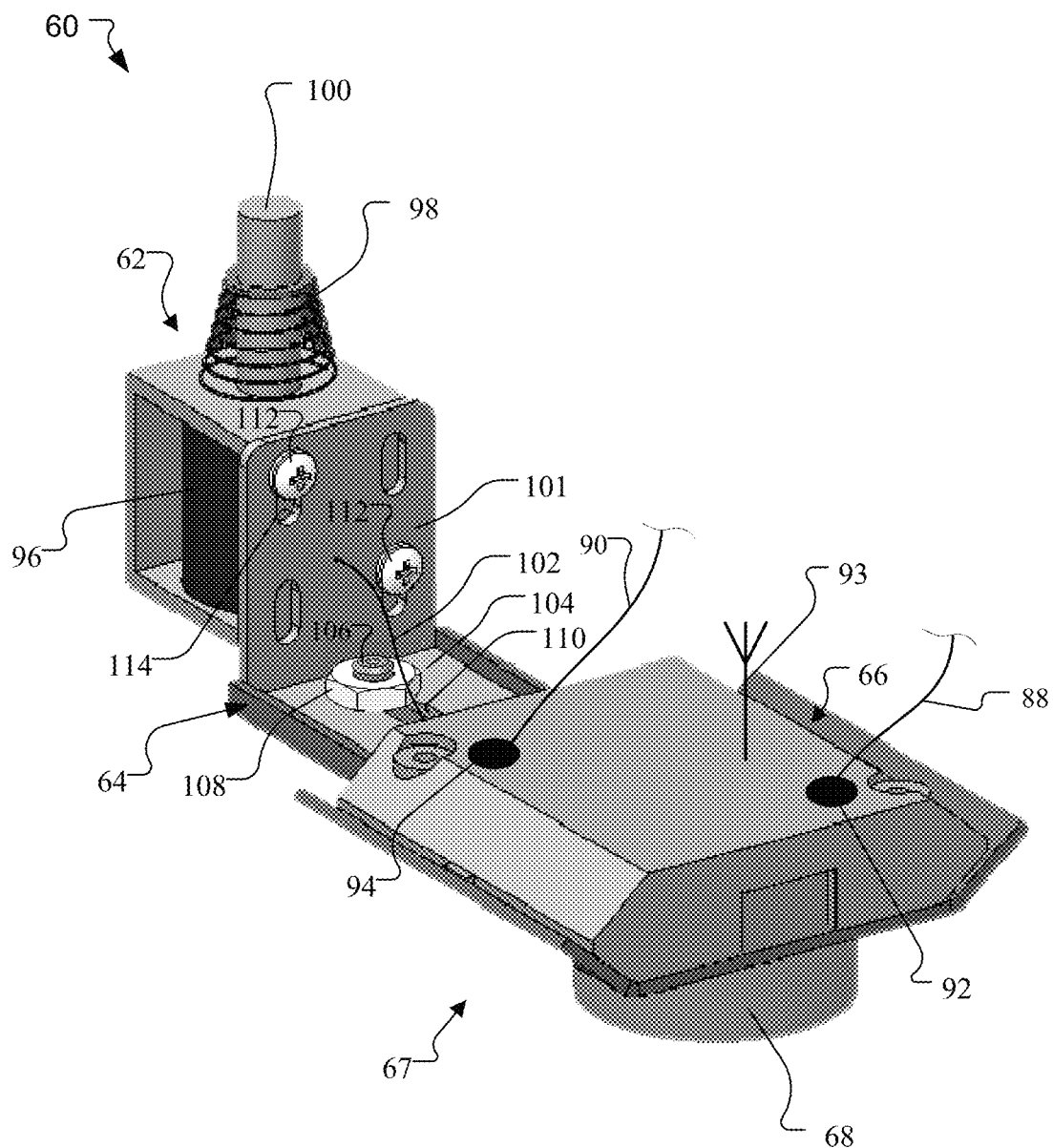
FIG. 2 is a perspective view of an interface actuator device, according to an embodiment of the present invention.

FIG. 2 is a perspective view of an embodiment of the interface actuator device 60.

In this example, the interface actuator device 60 uses a solenoid type of actuator 62 to engage and thus control the interface 21. In particular, the actuator 62 is a push-pull solenoid or a linear solenoid actuator. The actuator 62 has a solenoid 96 (e.g., 12 V DC solenoid) and a solenoid spring 98 for driving an actuator plunger 100. In use, the spring retained actuator plunger 100 can engage the interface 21 and specifically depress keys 24-32, 44-59 causing control of the interface 21. The actuator 62 can be configured to depress different types of keys 24-32, 44-59 that incorporate rubber switches, membrane switches, or touch-screen interface switches. In particular, the power used to drive the actuator 62 can be adjusted in order to depress keys 24-32, 44-59 with the required force but without damage to the interface. As appreciated by one of skill in the art, the actuator 62 can be replaced with another type of actuator such as a hydraulic actuator, a pneumatic actuator, a piezoelectric actuator, or other electro-mechanical actuator.

Figure 3A:
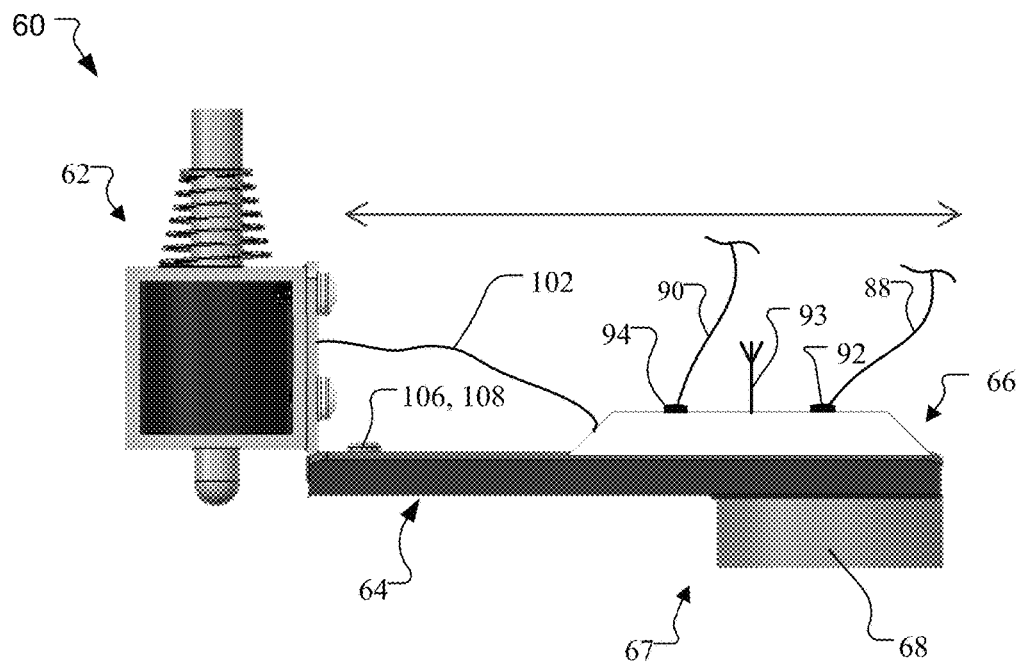
FIGS. 3A-3B are side views of the interface actuator device of FIG. 2 providing lateral positioning of its actuator.
Figure 3B:
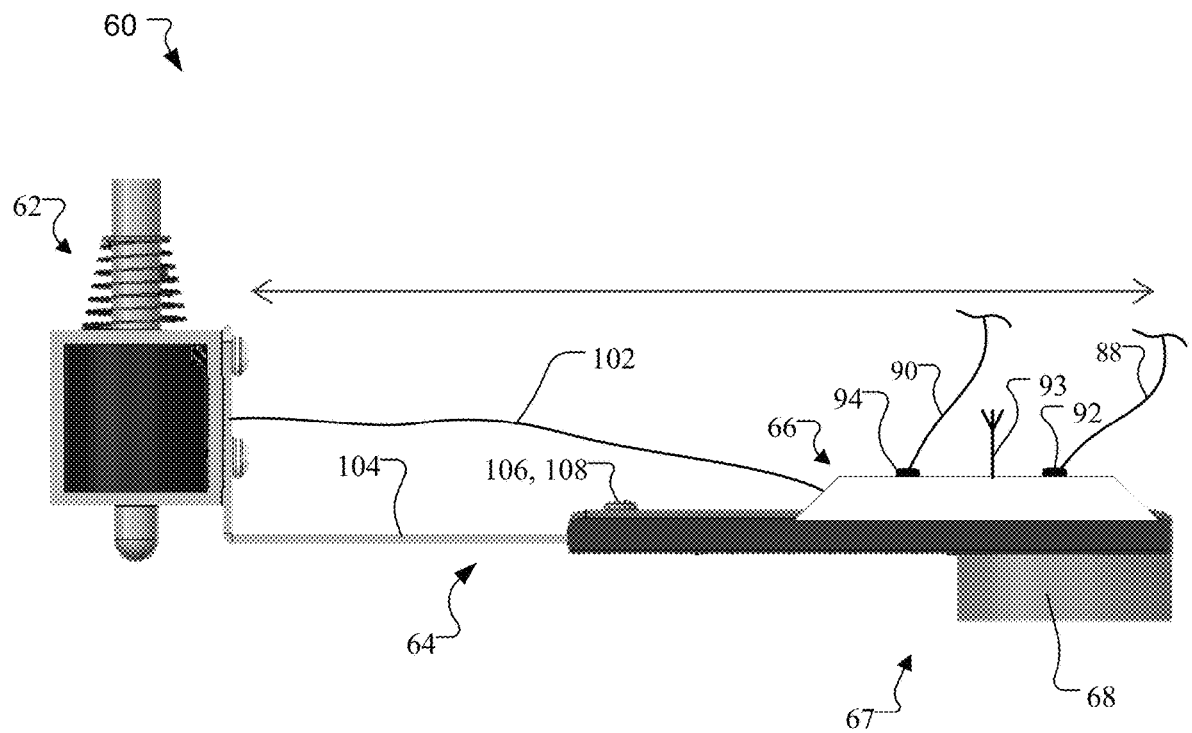

The frame 64 of the interface actuator device 60 provides lateral positioning of the actuator 62. The frame 64 has an extension arm 104 that telescopes to enable lateral positioning of the actuator 62 relative to the body 67. As illustrated in FIGS. 3A-3B, the extension arm 104 slides within an arm slot 110 to adjust a length of the extension arm 104 such that the actuator 62 can be set to a desired lateral position. Once the desired lateral position is set, an arm nut 108 or alternatively a, wingnut is screwed and tightened over an arm bolt 106 to secure the actuator 62 at the desired lateral position. This allows for the actuator 62 to be adjusted over any of the keys 24-32, 44-59. In one example, the extension arm 104 can provide between about 0 and about 2 inches of lateral position adjustment.

Figure 4A:
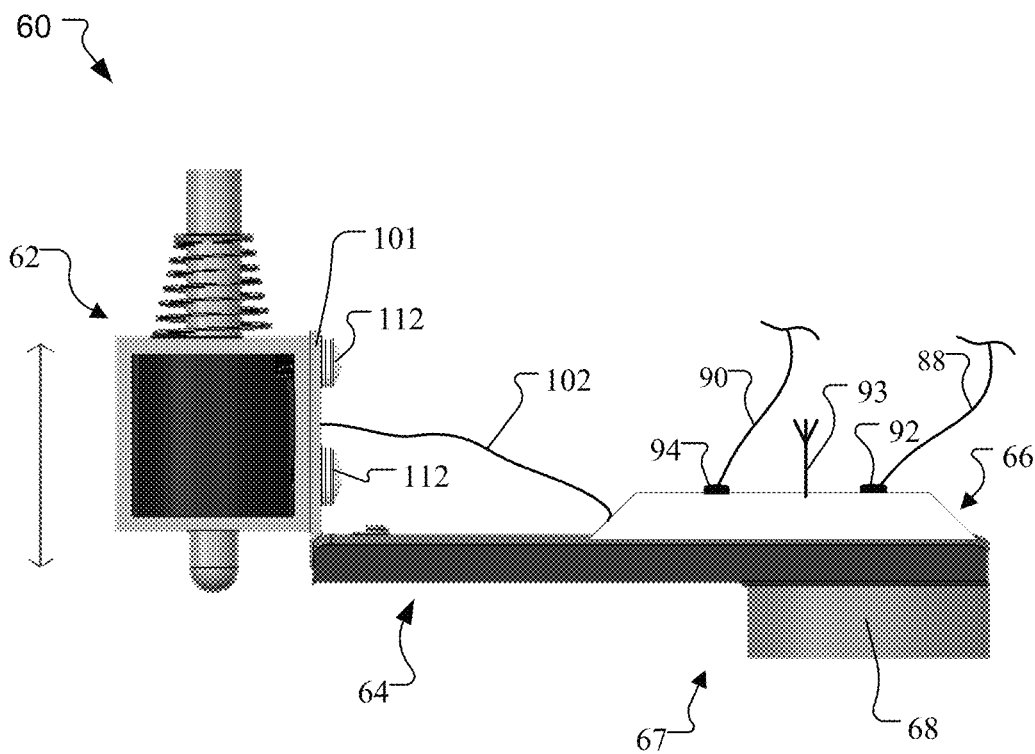
FIGS. 4A-4B are side views of the interface actuator device of FIG. 2 providing a height adjustment of its actuator.
Figure 4B:
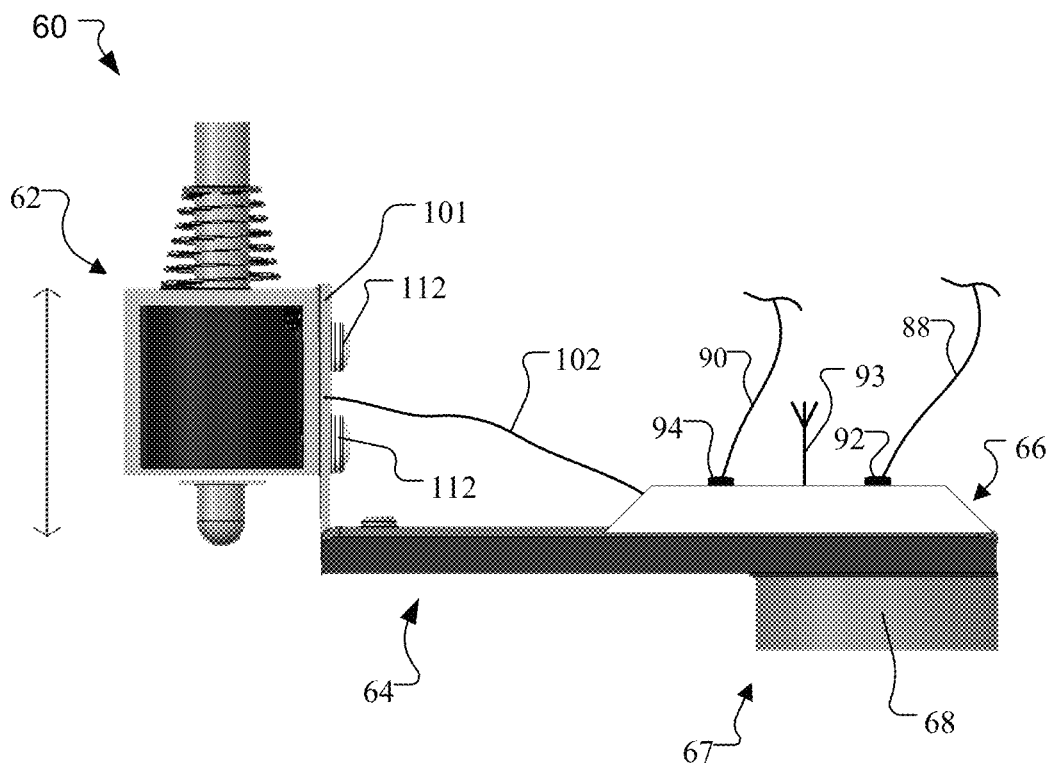

The frame 64 of the interface actuator device 60 provides height adjustment for the actuator 62 relative to a surface of the interface 21. The frame 64 has an actuator plate 101 that is mounted to one side of the actuator 62. The actuator plate 101 has vertical slot cuts 114 that receive screws 112 used to adjust the height of the actuator 62. Specifically, as illustrated in FIGS. 4A-4B, the screws 112 are unscrewed and loosened, moved vertically up or down in the vertical slot cuts 114 to a desired height, and then the screws 112 are screwed to secure the actuator 62 at the desired height. This allows for the height of the actuator 62 to be adjusted relative to the interface 21 which can impact the amount of force applied by the actuator 62 to the interface 21 or compensate for raised buttons. Thus, the height of the actuator 62 can be adjusted in order to function with different types of interfaces.

The body 67 includes an attachment mechanism 68 for mounting the interface actuator device 60 to the control panel 20. The attachment mechanism 68 secures the body 67 to a surface of the control panel 20 such as a surface of the interface 21. The attachment mechanism 68 makes it possible to easily mount, detach, and relocate the interface actuator device 60 at different locations along the control panel 20. The attachment mechanism 68 can be a magnet (e.g., neodymium ring magnet), an adhesive pad, adhesive strips, an adhesive film, or a suction device (including a suction cup) in different examples. The attachment mechanism 68 can also utilize other mechanisms for mounting the body 67 to the control panel as appreciated by one of skill in the art.

The body 67 includes an electronics module 66. The electronics module 66 specifically includes an actuator communication port 92 that accepts the communication cable harness 88. This allows the service box 77 to communicate with the electronics module 66 via the communication cable harness 88. The electronics module 66 also includes an actuator wireless interface 93 for communicating wirelessly with the service communication transceiver 83 of the service box 77 or communicating wirelessly with the access point 81.

The electronics module 66 also preferably has an actuator charger port 94 that is configured to receive external power. For example, the service box 77 can supply power to the electronics module 66 via the charger cable harness 90.

Figure 5:
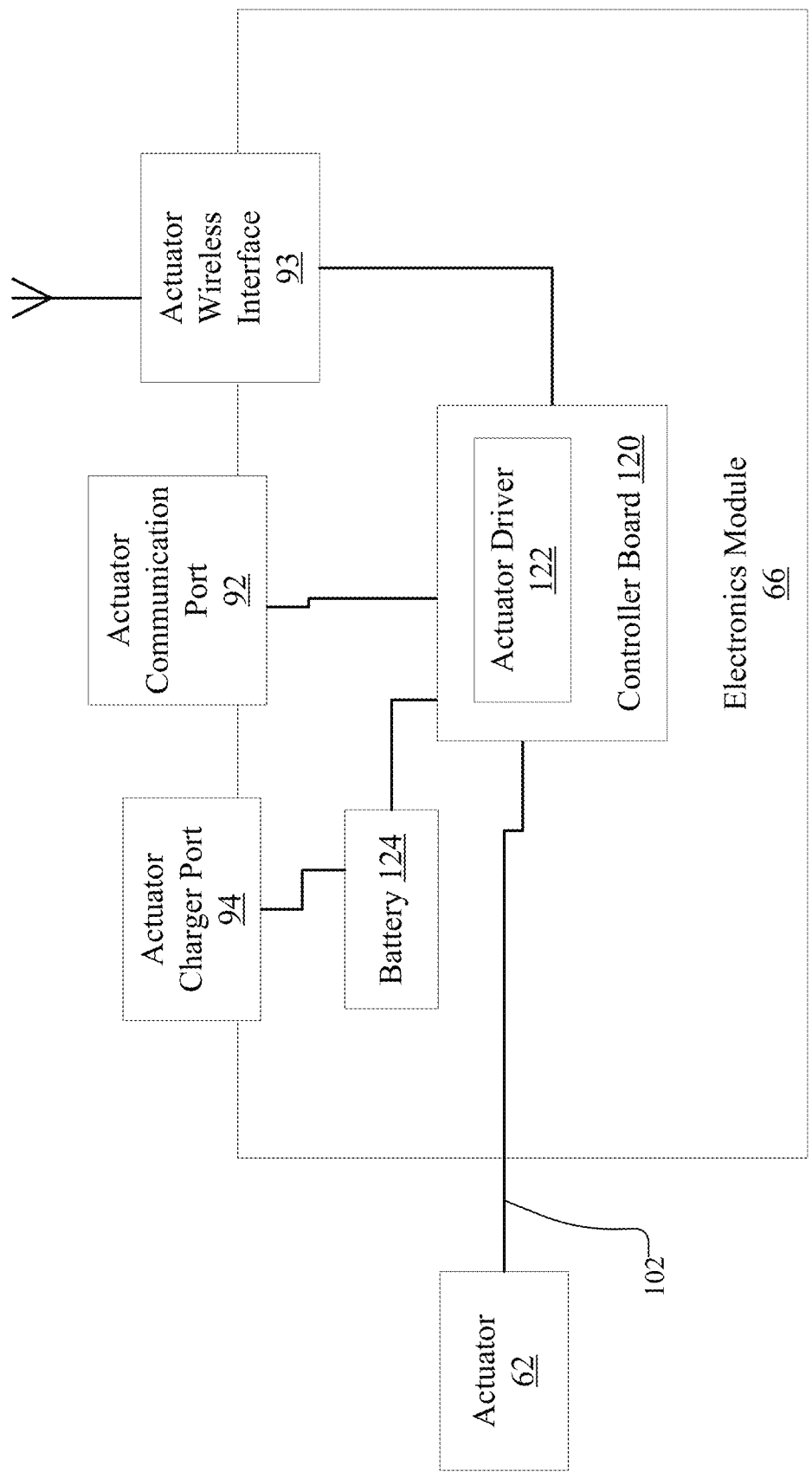
FIG. 5 is a block view of an electronics module in relation to the actuator of the interface actuator device of FIG. 2.

FIG. 5 schematically depicts the internal components of the electronics module 66 in relation to the service box 77 and the actuator 62.

The electronics module 66 has a controller board 120 for generally controlling the interface actuator device 60. An actuator driver 122 is mounted to the controller board 120 for providing control of the actuator 62. The actuator driver 122 is connected to the actuator 62 by an actuator control cable 102. Thus, the actuator driver 122 activates the actuator 62 via the actuator control cable 102.

The electronics module 66 includes a battery 124. The battery 124 supplies power to the controller board 120. The actuator driver 122 uses this supplied power to activate and drive the actuator 62. The actuator driver 122 can be programmed to drive level of the actuator 62 (i.e., providing more or less force to the interface 21) depending on the type of interface 21 (e.g., rubber keypad interface, membrane final user interface, or touch screen interface). The battery 124 can be a rechargeable battery (e.g., 12 V DC rechargeable lithium ion battery). For example, the battery 124 is a rechargeable battery that receives power from the service box 76 at the actuator charger port 94. Alternatively, the battery 124 can be a non-rechargeable battery.

The controller board 120 is wired to receive communication from the actuator communication port 92 and/or from the actuator wireless interface 93. For example, the controller board 120 receives the activation command from the service box 76 at the actuator communication port 92. In another example, the controller board 120 receives the activation command from the mobile device 74 at the actuator wireless interface 93. In response to activation command, the actuator driver 122 activates and powers the actuator 62 causing control of the interface 21.

Figure 6:
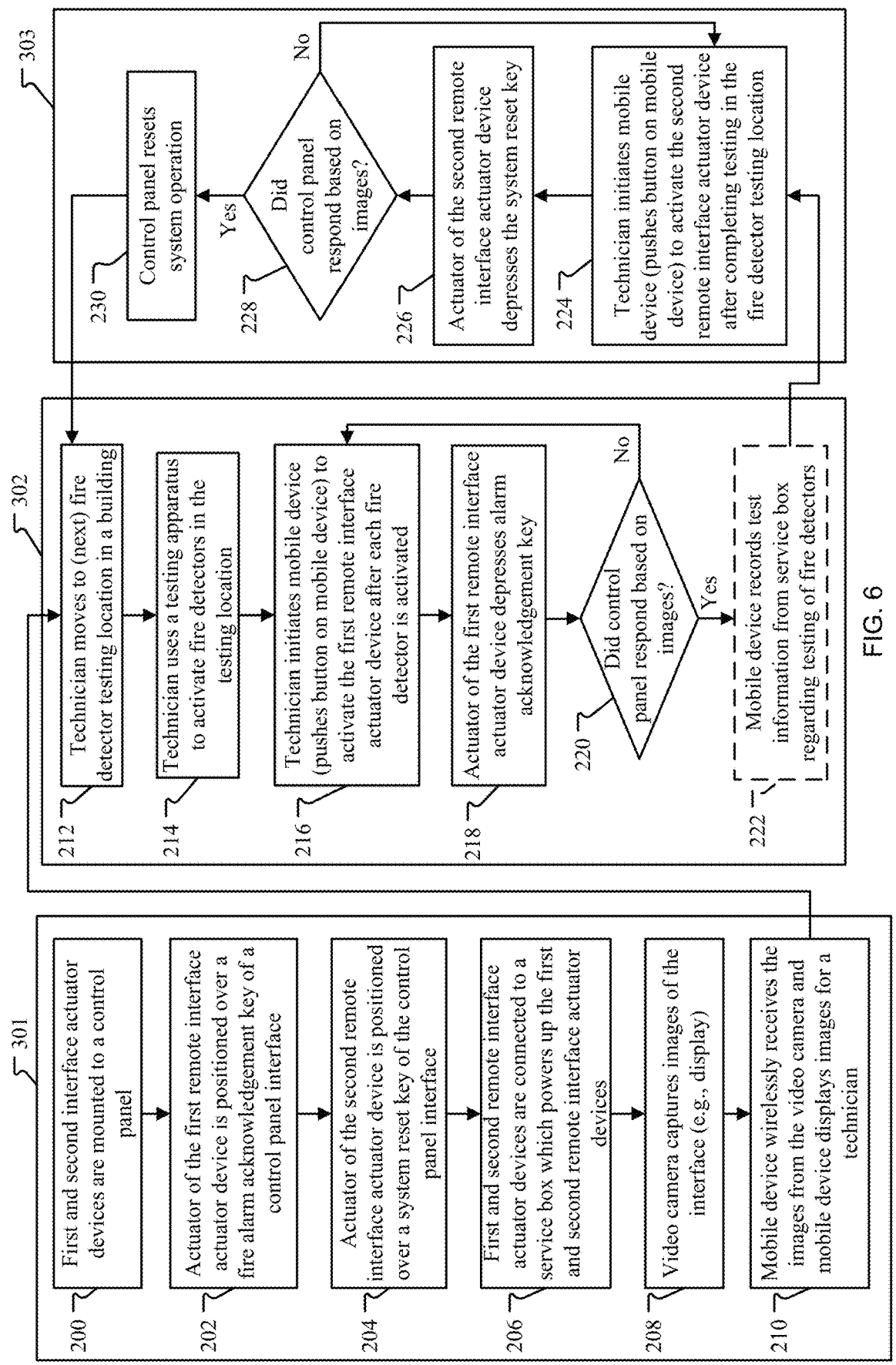
FIG. 6 is a flow chart illustrating a method of using interface actuator devices during the walkthrough test.

FIG. 6 is a flow chart illustrating a method of using the first and second interface actuator devices 60A, 60B during the walkthrough test as illustrated in FIGS. 1A-1C. The method can be split into three sections: Setup section 301, Testing section 302, and Resetting section 303.

The setup section includes steps 200-210. In step 200, the first and second interface actuator devices 60A, 60B are mounted to the control panel 20. The actuator 62 of the first remote interface actuator device 60A is positioned over the fire alarm acknowledgement key 24 (step 202). In step 204, the actuator 62 of the second remote interface actuator device 60B is positioned over the system reset key 32. In step 206, the first and second remote interface actuator devices 60A-60B are connected to the service box 77 which powers up the remote interface actuator devices 60A-60B. The video camera 72 is used to capture images of the interface 21 such as the display 22 of the interface 21 (step 208). In step 210, the mobile device 74 is used to wirelessly receive the images from the video camera 72. The mobile device 74 can then present images on its display for the technician 73 to view.

The testing section includes steps 212-222. In step 212, the technician 73 moves to a fire detector testing location in a building. Next, the technician 73 uses a testing apparatus 75 to activate fire detectors 14 in the fire detector testing location (step 214). The testing apparatus 75 includes a smoke port 76 for releasing real or artificial smoke at the distal end of the testing apparatus 75. The technician 73 initiates the testing apparatus 75 to introduce the smoke from the smoke port 76 to a nearby fire detector 14. In other examples, the testing apparatus 75 can further include a hood that is placed over the fire detector 14. The hood surrounds the fire detector 14 while the smoke port 76 of the testing apparatus 75 introduces the smoke into the hood. The smoke has the effect of activating the fire detectors 14. Upon activation, each fire detector 14 sends its alarm signals to the control panel 20. The technician 73 initiates the mobile device 74 (e.g., depresses button on mobile device or initiates mobile application to send activation command) to activate the first remote interface actuator device 60A after each fire detector 14 is activated to provide the control panel acknowledgement. When activated, the first remote interface actuator device 60A uses its actuator 62 to depress the alarm acknowledgement key 24 (step 218). In step 220, the technician 73 determines whether the control panel 20 responds to the first remote interface actuator device 60A by using the mobile device 74 to view the images of the interface 21. For example, the technician 73 can make this determination based on whether the display 22 presents such appropriate response to depressing the alarm acknowledgement key 24 (e.g., alarm is silenced). If no response, then step 216 is repeated to reactivate the first remote interface actuator device 60A. If response is confirmed, then the technician 73 can use the mobile device 74 to optionally record test information from the service box 77 regarding testing of the fire detectors 14 (step 222).

The resetting section includes steps 224-230. In step 224, the technician 73 controls the mobile device 74 (e.g., select an active area on its touch-screen display that corresponds to the activation control for the actuator devices) to activate the second remote interface actuator device 60B after completing testing in the fire detector testing location. The actuator 62 of the second remote interface actuator device 60B depresses the system reset key 32 (step 226). In step 228, the technician 73 determines whether the control panel 20 responds to the second remote interface actuator device 60B by using the mobile device 74 to view the images of the interface 21. For example, the technician 73 makes this determination based on whether the images show the display 22 presenting a system reset message. If no response, step 224 is repeated. If response is confirmed, then the control panel 20 proceeds to reset its system operation (step 230).

While this invention has been particularly shown and described with references to preferred embodiments thereof, it will be understood by those skilled in the art that various changes in form and details may be made therein without departing from the scope of the invention encompassed by the appended claims.

What is claimed is:

1. An interface actuator device for a control panel of a fire alarm system, comprising:
    an actuator for controlling an interface of the control panel;
    an attachment mechanism for mounting the interface actuator device to the control panel; and
    a frame for supporting the actuator on the attachment mechanism, wherein the frame includes an extension arm that telescopes in a cantilevered fashion over the interface to enable positioning of the actuator relative to the attachment mechanism.

2. The interface actuator device of claim 1, further comprising an actuator communication port for receiving an activation command from a service box causing the actuator to control the interface of the control panel.

3. The interface actuator device of claim 1, further comprising an actuator wireless interface for receiving an activation command from a service box or a mobile device causing the actuator to control the interface of the control panel.

4. The interface actuator device of claim 1, wherein the actuator comprises an actuator plunger and a solenoid for driving the actuator plunger to control the interface of the control panel.

5. The interface actuator device of claim 1, further comprising an electronics module having a battery for powering the actuator and a charger port for receiving power for recharging the battery.

6. The interface actuator device of claim 1, wherein the attachment mechanism is a magnet, an adhesive pad, or a suction device.

7. The interface actuator device of claim 1, further comprising a frame for supporting the actuator on the attachment mechanism, wherein the frame includes an extension arm that telescopes to enable positioning of the actuator relative to the attachment mechanism.

8. The interface actuator device of claim 7, wherein the frame provides for height adjustment of the actuator relative to a surface of the control panel.

* * * * *